UNITED STATES PATENT OFFICE.

SARDIS W. ISHAM, OF HINCKLEY, OHIO.

IMPROVEMENT IN PAINTS AND PIGMENTS.

Specification forming part of Letters Patent No. 101,880, dated April 12, 1870.

*To all whom it may concern:*

Be it known that I, SARDIS W. ISHAM, of Hinckley, in the county of Medina and State of Ohio, have invented a new and valuable Improvement in Paints; and I do hereby declare that the following is a full, clear, and exact description of the same.

My invention relates to preparations for paints; and it consists in a novel preparation of matter formed around chalybeate springs, usually called "oxide of iron." Around all springs of water where iron abounds such water becomes impregnated with the iron, and upon reaching the surface of the earth is precipitated after coming in contact with the oxygen of the air, thus forming a yellowish covering to the soil.

The object of my invention is to utilize this yellowish substance and adapt it for use as paint. I take the substance above mentioned and heat it in an oven until it assumes a black color, and then set it away to cool. When cool this substance becomes red. I then grind it to a fine powder and bolt it well, when it is ready for use in the ordinary way.

I claim as my invention—

The paint herein described, prepared in the manner substantially as specified.

In testimony that I claim the above I have hereunto subscribed my name in the presence of two witnesses.

Hinckley, February 9, 1870.

SARDIS W. ISHAM.

Witnesses:
    MORTIMER OLDS,
    G. S. GILLET.